United States Patent [19]

Gonzalez

[11] Patent Number: 5,762,039

[45] Date of Patent: Jun. 9, 1998

[54] BARREL ENGINE CONNECTING ROD

[75] Inventor: Cesar Gonzalez, Wichita, Kans.

[73] Assignee: The Cessna Aircraft Company, Wichita, Kans.

[21] Appl. No.: 785,173

[22] Filed: Jan. 20, 1997

[51] Int. Cl.⁶ .................................................. F02B 75/26
[52] U.S. Cl. ................................. 123/197.3; 123/56.4
[58] Field of Search ........................... 123/197.3, 56.4; 74/593, 594

[56] References Cited

U.S. PATENT DOCUMENTS

| | | | |
|---|---|---|---|
| 1,696,676 | 12/1928 | Fuhr | 123/56.4 |
| 1,869,440 | 8/1932 | Schlenker | 123/56.4 |
| 4,369,742 | 1/1983 | Everts | 123/197.3 |
| 4,497,284 | 2/1985 | Schramm | 123/56.4 |
| 5,094,195 | 3/1992 | Gonzalez | 123/56.4 |

*Primary Examiner*—Marguerite McMahon
*Attorney, Agent, or Firm*—Edward L. Brown, Jr.

[57] ABSTRACT

A two piece connecting rod assembly for a axial cylinder, internal combustion engine with each rod half having a bearing sleeve at each end for pivotal engagement with the universal joint turnion. The two rods are connected to each other at their centers and spaced apart concentric relations through a pair of raised bosses with mating surfaces and a bolt for retention of the two rod halves as a unified structure.

6 Claims, 2 Drawing Sheets

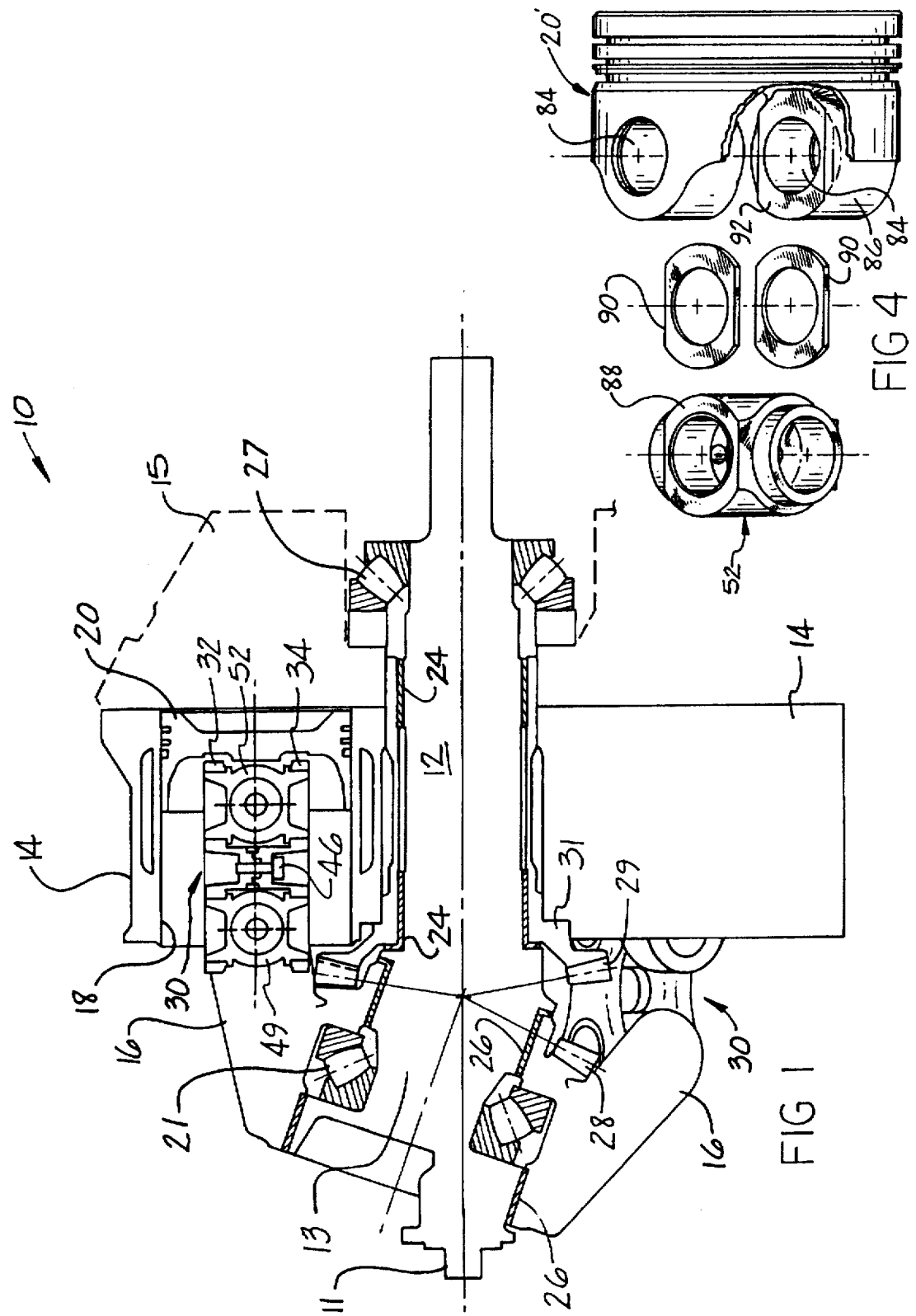

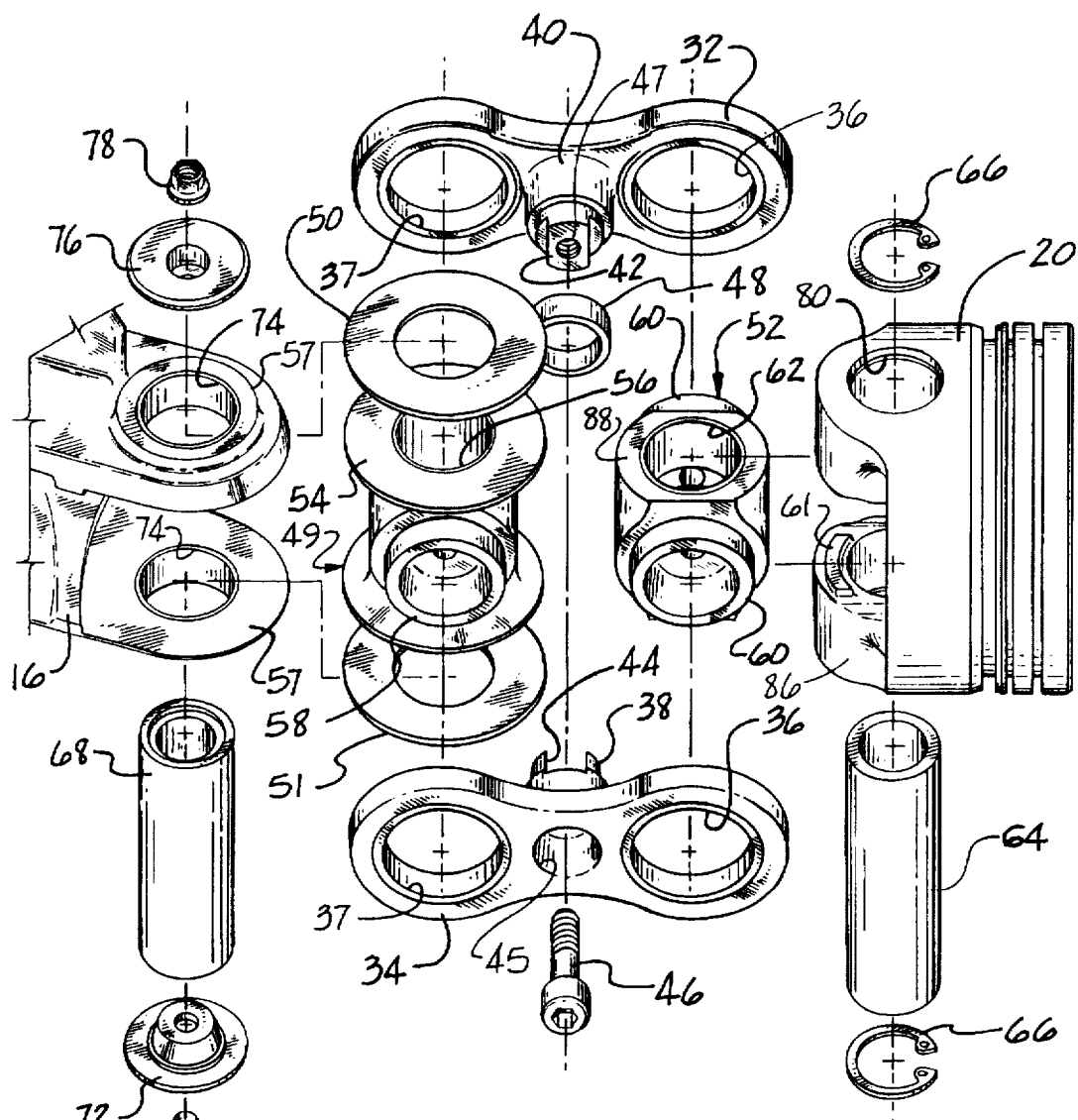
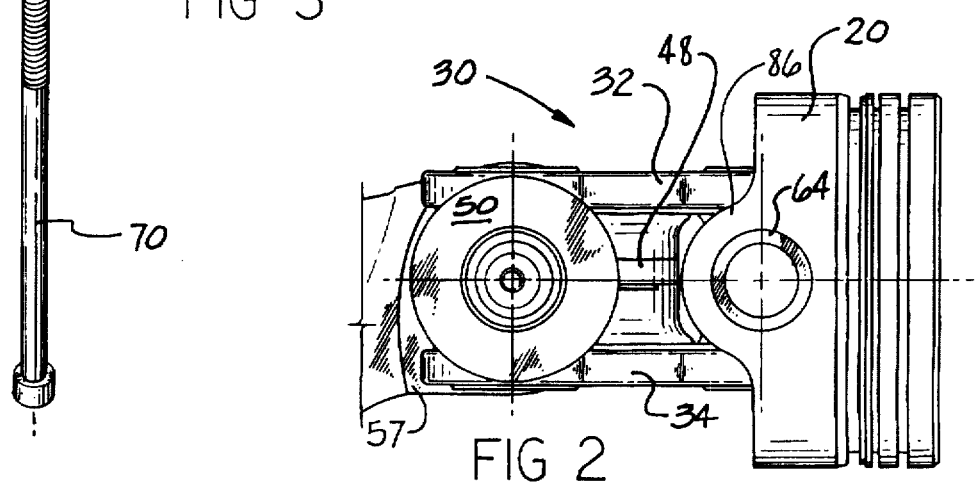

BARREL ENGINE CONNECTING ROD

BACKGROUND OF THE INVENTION

The present invention relates to internal combustion piston engines and more specifically to the universal joint connecting rod of a barrel type or axial piston engines wherein the cylinders are arranged around a central drive shaft, with the axis of the cylinders lying parallel to the drive shaft.

Many patents on barrel type engines have been granted over the years, including applicant's own U.S. Pat. No. 5,094,195. Despite their early designs, barrel engines have not had any significant commercial successes. Their only commercial success has been in the configuration of hydraulic pumps and motors rather than internal combustion engines in the last fifty years. There have been military applications as a torpedo engine powered by liquid oxygen and hydrocarbon fuels. In aviation, barrel engines have particular appeal because of their compact design and reduced frontal area, as compared with radial engines or opposed air cooled cylinder engines of comparative cylinder displacement.

In barrel engines, the conversion of reciprocating piston motion to rotary drive shaft motion has been accomplished by devices referred to as swash plates or wobble plates, as shown in Schramm (U.S. Pat. No. 4,497,284); or a cylindrical cam and roller followers, as shown in Sappington (U.S. Pat. No. 2,256,952). They have also been referred to as spiders which are driven by offset shafts, as shown in applicant's own above-mentioned patent. Due to the rotational and wobbling action of the swash plate or spider, it is necessary to have universal joints located somewhere between the engine pistons and the spider. In applicant's above-mentioned patent, this universal joint action was achieved with ball and socket joints which are difficult to service and maintain. Furthermore, the construction of a ball and socket joint is very difficult to machine while holding tolerances and therefore is very costly.

Various barrel engine designs providing this mechanical connection between a reciprocating piston and a wobbling, or rotating swash plate have been made, as typified in the above-mentioned patents to Schramm and Sappington and to Schlenker (U.S. Pat No. 1,869,440) and Fuhr (U.S. Pat. No. 1,696,676). In most of the above-mentioned designs, the connecting rod between the piston and the spider is a unitary structure such as utilized with conventional crankshaft engines.

SUMMARY OF THE PRESENT INVENTION

The present invention is directed to a connecting rod assembly which includes two connecting rod halves, also referred to as connecting rods, joined as a unitary structure upon assembly by an extended boss on each connecting rod which has mating surfaces engagable with the boss of the opposing rod whereby the alignment of the bearings at opposite ends of each connecting rod are maintained in concentric alignment for support and engagement of both the spider trunion and the piston trunion. After opposing connecting rods have been slid in place over the ends of the spider trunion and the piston trunion, they are retained in place by a bolt passing through the center of the mating bosses providing a rigid, spaced apart connecting rod structure. The lateral tolerance fit between the connecting rod halves and trunions is varied by inserting different size spacer sleeves between two engaging bosses, one on each opposing connecting rod.

It is therefore the principal object of the present invention to provide a simplified connecting rod design which incorporates a pair of opposing like rods with unbroken bearings.

Another object of the present invention is to provide a connecting rod assembly with a maximum of bearing area.

A further object of the present invention is to provide a more simplified connecting rod assembly in manufacturing, assembly and service.

BRIEF DESCRIPTION OF THE DRAWINGS

FIG. 1 is a side elevation in longitudinal section of a barrel engine with some portions omitted illustrating the connecting rods of the present invention along with some portions of the engine in symbolic form;

FIG. 2 is a side view of an assembled connecting rod with one of the spider ears broken away;

FIG. 3 is an exploded view of the piston rod assembly, including its piston and spider trunions and a portion of the spider.

FIG. 4 is an exploded view of a modified piston bearing surface, including the piston trunion.

DESCRIPTION OF THE PREFERRED EMBODIMENT

The connecting rod assembly of the present invention is best seen in FIG. 3 and is generally described by reference numeral 30. The internal combustion barrel engine is which the connecting rod assembly 30 is located is generally described by reference numeral 10, as seen in FIG. 1, and generally includes a stationary cylindrical cylinder block 14 having a rotating drive shaft 12 passing therethrough. Driveshaft 12 includes an offset end portion 13 which rotatably supports a spider 16 on a pair of sleeve bearings 26 and a roller thrust bearing 21.

While only one cylinder 18 is shown in FIG. 1, the engine 10 can include 5, 7 or 9 cylinders. Spider 16 includes a ring gear 28 which meshes with ring gear 29 on cylinder block 14 as it wobbles. Spider 16 does not rotate.

The connecting rod assembly 30 of the present invention comprises a pair of connecting rods or connecting rod halves 32 and 34, as best seen in FIG. 3, which engage journals 60 of piston trunion 52 and journals 58 of spider trunion 49 and will be later described in detail. Drive shaft 12 rotates in cylinder block 14 in a pair of sleeve bearings 24 and is limited from axial movement by thrust roller bearing 27 which bears against head 15 which is only symbolically shown since it is not a part of the present invention.

Both connecting rods 32 and 34 include a pair of unbroken bearings 36 and 37 at opposite ends of the respective rods. Bearings 36 on each rod 32 and 34 engage a pair of journals 60 extending outwardly from both sides of piston trunion 52 in a sandwiched relationship. Piston trunion 52 includes two bushings 62 positioned normal to journals 60, through the center of piston trunion 52. Bushings 62, in turn, engage piston pin 64 once assembled. Piston pin 64 is held in place in piston 20 by a pair of conventional snap rings 66. At the left end of connecting rods 32 and 34, as seen in FIG. 3, is a similar bearing 37 in both rods which engages a pair of journals 58 extending outwardly from both sides of spider trunion 49. Spider trunion 49 includes two normally positioned bushings 56 relative to journals 58 passing completely through trunion 49. Trunion 49 is in turn rotatably journaled on pin 68 which is anchored to spider 16 through a pair of bushings 74 located in a pair of ears 57 which are an integral part of spider 16. Pin 68 is held in place in spider 16 by a concentrically positioned bolt 70 which passes through enlarged retainer washers 72 and 76 for engagement with nut 78. Spider trunion 49 includes a thrust bearing surface 54 which handles thrust loadings through washer 50 against the inside surfaces of ears 57 on the spider. On the inside of piston skirt 86, as seen in FIG. 3, is a raised thrust surface 61 which transmits thrust loading from the piston trunion bearing surface 88 to the piston 20.

FIG. 4 illustrates a modified bearing surface 92 on the piston skirt 86. Positioned between surface 92 and the trunion bearing surface 88 is a washer 90 which is fully supported by bearing surface 92.

Located in the approximate center of each piston rod 32 and 34 is a outwardly extending boss 40 and 38 respectively as seen in FIG. 3. Boss 38 includes a cross slot 44 sized to receive a two-sided end post 42 located on the opposing connecting rod 32. End post 42 snugly receives mating slot 44 in the opposing connecting rod half which maintains a concentric alignment of the pairs of bearings 37 and 36. The bosses 40 and 38 are not centered between bearings 37 and 36 but rather are offset so they cannot be wrongly assembled.

Also positioned between connecting rods 32 and 34 is a spacer sleeve 48 which is held in place therebetween by bolt 46 which passes through a recessed opening 45 and a bolt hole for engagement with a threaded bolt opening 47 in opposing connecting rod 32. With the two connecting rod halves 32 and 34 fully assembled in sandwiched relation around journals 58 and 60 and the attachment bolt properly torqued, spacer sleeve 48 provides the correct lateral tolerance fit for the opposing pair of bearings 37 and 36 on their respective trunions 49 and 52. Bolt 46 can utilize various well known forms to lock the bolt in place. Sleeve spacer 48 can be changed to adjust the tolerance fit of the connecting rod assembly 30. Both trunions 49 and 52 basically provide universal joints at the ends of pistons rods 32 and 34 due to the normally positioned rotational bushings 62 and 56 thereby allowing their respective trunion to freely pivot on pins 64 and 68 respectively.

FIG. 2 illustrates an assembled side view of the connecting rod assembly assembled on piston 20 for pivotally attached to spider 16. FIG. 2 illustrates spider 16 with its upper ear 57 broken away to better illustrate the assembly. Located between thrust bearing 54 and ears 57 is a flat thrust washer 50.

The double connecting rod design which engage trunion journals 58 and 60 in a sandwiched relationship allows the use of solid bearings 36 and 37 in place of conventional bolt-on split bearings which are most commonly used in piston engines. This pair of connecting rods 32 and 34 with solid bearings surrounding and retaining journals 58 and 60 provide in a very simple, high strength connecting rod design for a piston engine with a minimal amount of rod bolts as compared with conventional designs.

Having described the invention with sufficient clarity to enable those familiar with the art to construct and use it, I claim:

1. A connecting rod in an axial cylinder, internal combustion engine having a drive shaft with an offset portion driving a spider which in turn drives reciprocating pistons through connecting rods having universal joint trunions at both ends of the connection rods, the improvement comprising:

a connecting rod assembly for each piston including a pair of opposing connecting rods joined together in a spaced apart relation, each connecting rod including, a pair of bushings, one located at each end thereof for engagement with a universal joint trunion;

releasable connecting means joining the pair of opposing connecting rods as a unitary structure with the bushings of each rod in concentric alignment with the opposite rod bushings.

2. A connecting rod assembly as set forth in claim 1 wherein said connecting means includes a boss on each opposing connecting rod located between said pair of bushings, said boss having a mating surface engagable with a mating surface on the opposite connecting rod and a threaded fastener and mating threaded opening on one of said bosses for joining said opposing connecting rods.

3. A connecting rod assembly as set forth in claim 1, wherein the releasable connecting means joins the pair of opposing connecting rods at a point between the pair of bushings.

4. A connecting rod assembly as set forth in claim 1, wherein the releasable connecting means joins the pair of opposing connecting rods at a point between the pair of bushings and spacer sleeve means are positioned between the pair of bosses to provide the correct tolerance spacing between the pair of opposing connecting rods and the trunions engaged therebetween.

5. A connecting rod in an axial cylinder, internal combustion engine having a drive shaft with an offset portion driving a spider which in turn drives reciprocating pistons through connecting rods having universal joint trunions at both ends of the connection rods, the improvement comprising:

a connecting rod assembly for each piston including a pair of opposing connecting rods joined together in a spaced apart relation, each connecting rod including, a pair of bushings, one located at each end thereof for engagement with a universal joint trunion;

releasable connecting means joining the pair of opposing connecting rods as a unitary structure with the bushings of each rod in concentric alignment with the opposite rod bushings;

a boss on each connecting rod located between said pair of bushings, said boss having a mating surface engagable with a mating surface on the opposing rod;

a threaded opening concentrically positioned in one of said bosses; and a threaded fastener on the mating connecting rod having an opening therein for receipt of said fastener which fastener engages the threaded opening to retain the two connecting rods in alignment with each other.

6. A connecting rod assembly as set forth in claim 5, wherein each boss on each connecting rod is offset from the midpoint between the pair of bushings and each connecting rod.

* * * * *